Dec. 9, 1952   A. SCRIVENER   2,620,569
MEANS FOR GAUGING OR CHECKING SCREW THREADS
Filed May 20, 1947

INVENTOR
ARTHUR SCRIVENER
BY Marshall and Marshall
ATTORNEYS

Patented Dec. 9, 1952

2,620,569

UNITED STATES PATENT OFFICE 2,620,569

MEANS FOR GAUGING OR CHECKING SCREW THREADS

Arthur Scrivener, Birmingham, England

Application May 20, 1947, Serial No. 749,162
In Great Britain December 18, 1946

1 Claim. (Cl. 33—199)

This invention has reference to means for gauging or checking screw-threads which have been formed on the workpiece say by a thread grinding operation in a centreless grinding machine or otherwise.

The invention consists of means for gauging or checking screw-threads by mounting the workpiece on and between two or more spaced supports above and between which supports a gauging point is disposed whereby upon rotation of the workpiece an observation can be made on a magnifying index associated with the gauge point of any departure from the mean line, the gauge point preferably being located at the pitch line of the thread.

One means of carrying the invention into practice will now be described with particular reference to the accompanying diagrammatic drawings, in which.

Figure 1:
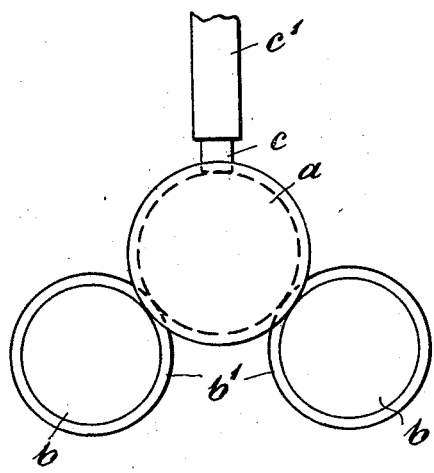
Fig. 1 is an end elevation of the device.
Figure 2:
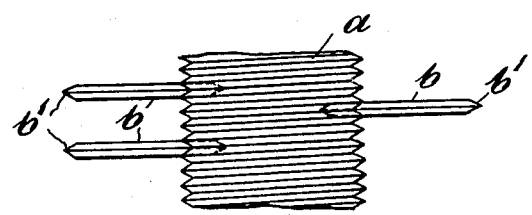
Fig. 2 is a plan of Fig. 1 with the gauging point removed.

The support for the workpiece $a$ which takes the form of a screw-threaded rod comprises three freely rotatable discs $b$ each having an outer peripheral edge $b1$ the contour of which is such as to engage within the thread of the screw of the rod $a$ which is to be subjected to test. The discs $b$ are spaced apart at intervals corresponding to the pitch of the screw so that the workpiece can be said to rest on and be supported at three points by the said discs.

Located above the screw-threaded rod $a$ and between vertical planes passing through the axis of the discs $b$ is a gauge point $c$ which is associated with a spring-loaded plunger $c1$, the lower edge of which is adapted for location within the screw-thread on a line co-incident with the pitch line of the screw-thread. This plunger is connected in known manner to a magnifying gauge indicator (not shown) of a mechanical, optical, or electrical type whereby any departure from the normal or standard point of indication can be readily observed.

By rotating the workpiece $a$ on the discs $b$ any variation which obtains in the formation of the screw-thread will be communicated to the spring-loaded plunger $c1$ and a magnification of any such departure from the desired standard or mean can be readily observed.

As an alternative to the discs $b$ the supports can take the form of wires or plates, means being provided whereby the setting of these supports can be adjusted to accord with the pitch of the screw-thread to be gauged.

The supporting discs $b$ or the like of the gauge are adapted to be mounted on a common framework or base (not shown) so that the relative position of the gauge point $c$ to the threaded workpiece $a$ and to the supports $b$ therefor can be accurately determined and set.

I claim:

Means for checking the pitch diameter of an externally threaded object comprising, in combination, a set of three freely rotatable discs, said discs each having a sharp edge the cross-section of which matches the space between the sides of the thread of the object at the pitch line thereof, said discs being arranged in spaced apart relation along a pair of axes that are parallel to the axis of the object and that are spaced apart a distance less than the sum of the diameter of a disc and the diameter of the object, and a gauge point which has a tip fitting between the sides of the thread and which is movable along a line that is generally radial of the object and an extension of which passes between said axes and said discs.

ARTHUR SCRIVENER.

REFERENCES CITED

The following references are of record in the file of this patent:

UNITED STATES PATENTS

| Number | Name | Date |
|---|---|---|
| 1,336,189 | Bechler | Apr. 6, 1920 |
| 1,423,339 | Ledell | July 18, 1922 |
| 1,808,816 | Johnson | June 9, 1931 |

FOREIGN PATENTS

| Number | Country | Date |
|---|---|---|
| 36,936 | France (Addition) | May 20, 1930 |
| 216,443 | Switzerland | Dec. 1, 1941 |
| 219,182 | Switzerland | May 1, 1942 |
| 469,401 | Germany | Dec. 11, 1928 |

OTHER REFERENCES

Publ.: Berndt, Die Gewinde, Berlin, 1925 pp. 336 and 343.